United States Patent
Itoh et al.

(10) Patent No.: US 9,169,860 B2
(45) Date of Patent: Oct. 27, 2015

(54) ADHESION FLANGE STRUCTURE

(75) Inventors: Daisuke Itoh, Toyota (JP); Shinji Miwa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 14/002,264

(22) PCT Filed: Mar. 1, 2011

(86) PCT No.: PCT/JP2011/054648
§ 371 (c)(1),
(2), (4) Date: Sep. 26, 2013

(87) PCT Pub. No.: WO2012/117527
PCT Pub. Date: Sep. 7, 2012

(65) Prior Publication Data
US 2014/0030010 A1    Jan. 30, 2014

(51) Int. Cl.
*F16B 11/00* (2006.01)
*F16B 5/08* (2006.01)
*B62D 27/02* (2006.01)

(52) U.S. Cl.
CPC .............. *F16B 11/00* (2013.01); *B62D 27/026* (2013.01); *F16B 5/08* (2013.01); *F16B 11/006* (2013.01); *Y10T 403/477* (2015.01)

(58) Field of Classification Search
USPC ..................................... 403/270; 296/191, 29
See application file for complete search history.

(56) References Cited

U.S. PATENT DOCUMENTS 3,350,536 A *  10/1967  Bush et al. ....................... 219/92
3,822,464 A *  7/1974  Hester et al. ............. 428/355 AC
4,727,232 A *  2/1988  Omori et al. .................. 219/91.2
5,362,120 A *  11/1994  Cornille, Jr. .............. 296/203.01
5,645,364 A *  7/1997  Hodozuka et al. ............. 403/270
5,985,435 A *  11/1999  Czaplicki et al. .............. 428/323
6,291,792 B1 *  9/2001  Fussnegger et al. ........... 219/118
6,751,581 B1 *  6/2004  Ondrus et al. ..................... 703/6
7,004,536 B2 *  2/2006  Wieber ......................... 296/210

(Continued)

FOREIGN PATENT DOCUMENTS

| DE | 10 2006 054 470 A1 | 5/2008 |
|----|---|---|
| JP | U-58-182875 | 12/1983 |
| JP | A-01-107974 | 4/1989 |
| JP | U-01-149063 | 10/1989 |
| JP | A-05-092772 | 4/1993 |
| JP | A-2006-167753 | 6/2006 |

(Continued)

OTHER PUBLICATIONS

Extended European Search Report dated Sep. 4, 2014 from European Patent Application No. 11859777.2.

*Primary Examiner* — Daniel Wiley
(74) *Attorney, Agent, or Firm* — Oliff PLC

(57) ABSTRACT

An adhesion flange structure includes: a first flange extending along and formed to an end portion of a first vehicle body panel with an interposing bend portion; a second flange formed to an end portion of a second vehicle body panel configuring a section of a vehicle body together with the first vehicle body panel, the second flange formed facing the bend portion and the first flange; an adhesive that adheres the bend portion and the first flange to the second flange; a ridge projection portion formed extending along the direction the first flange extends along the end portion of the first vehicle body panel, and formed to at least one portion out of the bend portion and a facing portion of the second flange that faces the bend portion, the ridge projection portion forming a projection towards the opposing side out of the bend portion and the facing portion.

2 Claims, 5 Drawing Sheets

(56) References Cited

U.S. PATENT DOCUMENTS

| | | | | |
|---|---|---|---|---|
| 7,115,324 | B1* | 10/2006 | Stol et al. | 428/594 |
| 7,780,226 | B2* | 8/2010 | Sugimura et al. | 296/216.07 |
| 7,985,317 | B2* | 7/2011 | Himuro et al. | 156/307.5 |
| 8,047,593 | B2* | 11/2011 | Fuchs et al. | 296/30 |
| 2005/0102817 | A1* | 5/2005 | Sovoda | 29/509 |

FOREIGN PATENT DOCUMENTS

| | | |
|---|---|---|
| JP | A-2006-167764 | 6/2006 |
| JP | A-2007-046646 | 2/2007 |
| JP | A-2008-296557 | 12/2008 |
| JP | A-2010-242943 | 10/2010 |
| JP | A-2010-264827 | 11/2010 |

* cited by examiner

ADHESION FLANGE STRUCTURE

TECHNICAL FIELD

The present invention relates to an adhesion flange structure.

BACKGROUND ART

Structures are known that include an upper side metal plate that is curved to form an upper wall portion and an upper side flange, and a lower side metal plate that is curved to form a lower wall portion and a lower side flange. The upper side flange and the lower side flange are joined together using an adhesive (see for example Japanese Patent Application Laid-Open (JP-A) No. 2006-167753).

RELATED ARTS

Patent Document 1: Japanese Patent Application Laid-Open (JP-A) No. 2006-167753
Patent Document 2: JP-A No. H1-107974
Patent Document 3: JP-A No. 2006-167764
Patent Document 4: JP-A No. 2010-264827
Patent Document 5: JP-A No. 2010-242943

SUMMARY OF INVENTION

Technical Problem

However, in structures such as that described above, when for example a bend portion between the upper wall portion and the upper side flange is adhered to the lower side metal plate in a floating state positioned a specific dimension or greater from the lower side metal plate, a thickness of the adhesive is increased between the bend portion and the lower side metal plate, and the rigidity of the bend portion may not be secured.

In consideration of the above circumstances, a subject of the present invention is to provide an adhesion flange structure capable of securing the rigidity of a bend portion.

Solution Addressing Subject

In order to address the above issues, an adhesion flange structure of the present invention includes: a first flange extending along an end portion of a first vehicle body panel, and formed at the end portion of the first vehicle body panel with a bend portion interposed therebetween; a second flange formed at an end portion of a second vehicle body panel that configures a section of a vehicle body together with the first vehicle body panel, the second flange facing the bend portion and the first flange; an adhesive that adheres the bend portion and the first flange to the second flange; and a ridge projection portion formed extending along a direction in which the first flange extends at the end portion of the first vehicle body panel, and formed to at least one portion out of the bend portion and a facing portion of the second flange that faces the bend portion, the ridge projection portion forming a projection towards another portion out of the bend portion and the facing portion.

According to this adhesion flange structure, the ridge projection portion is formed to at least one portion out of the bend portion and the facing portion of the second flange that faces the bend portion such that the ridge projection portion projects towards the other side out of the bend portion and the facing portion. The thickness of the adhesive between the bend portion and the facing portion can be reduced due to forming the ridge projection portion, thereby enabling the rigidity of the bend portion to be secured.

In the adhesion flange structure of the present invention, configuration is preferably made wherein the ridge projection portion is formed at both the bend portion and the facing portion.

By employing such a configuration, the thickness of the adhesive between the bend portion and the facing portion can be reduced even further, thereby enabling the rigidity of the bend portion to be further secured.

Advantageous Effects of Invention

As has been described in detail above, the present invention is capable of securing the rigidity of the bend portion.

DESCRIPTION OF EMBODIMENTS

Explanation follows regarding an exemplary embodiment of the present invention.

Figure 1:
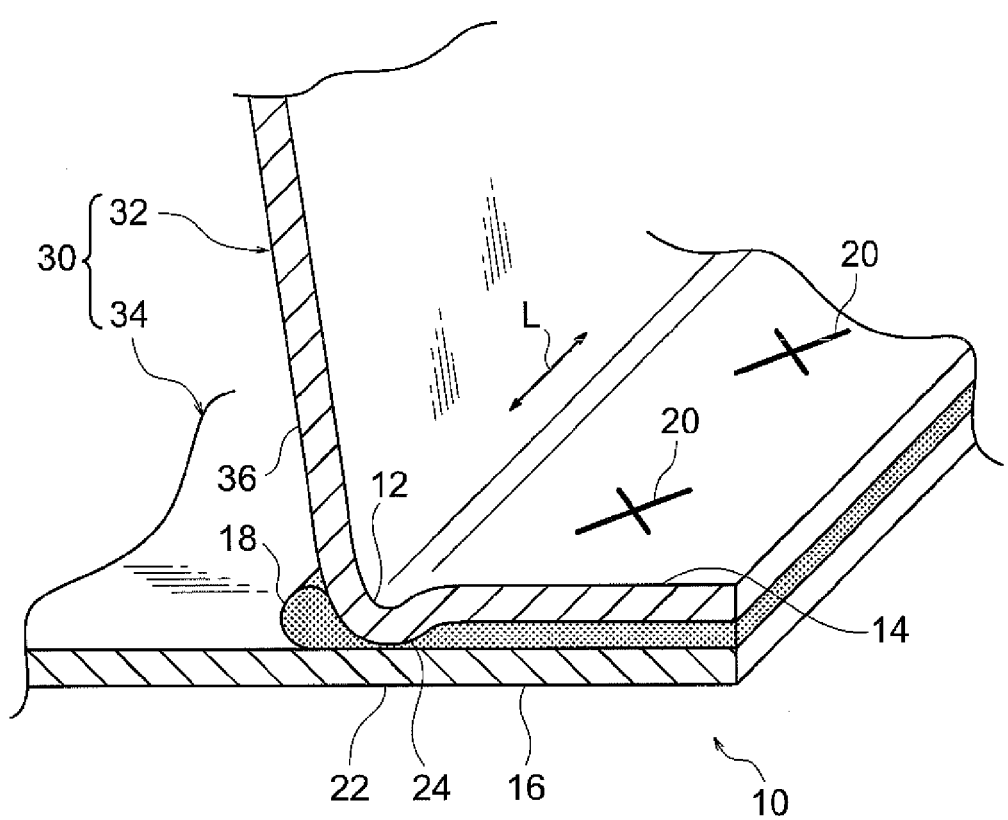
FIG. 1 is a perspective view illustrating relevant portions of a vehicle body framework member applied with an adhesion flange structure according to an exemplary embodiment of the present invention.

A vehicle framework member 30 illustrated in FIG. 1 configures a portion of a vehicle body, and includes a first vehicle body panel 32 and a second vehicle body panel 34. The first vehicle body panel 32 and the second vehicle body panel 34 are respectively configured by steel plates. The first vehicle body panel 32 is formed with a hat shaped cross-section profile open towards a second vehicle body panel 34 side. The second vehicle body panel 34 is formed in a flat plate shape, and forms a closed cross-section portion together with the first vehicle body panel 32. An adhesion flange structure 10 according to an exemplary embodiment of the present invention is applied to the first vehicle body panel 32 and the second vehicle body panel 34.

Namely, the first vehicle body panel 32 is formed with a side wall portion 36 that projects up with respect to the second vehicle body panel 34. An end portion at a second vehicle body panel 34 side of the side wall portion 36 is formed with a first flange 14 with a bend portion 12 interposed therebetween. The first flange 14 extends in an L direction along the end portion at the second vehicle body panel 34 side of the side wall portion 36. An end portion at a first flange 14 side of the second vehicle body panel 34 is formed with a second flange 16 facing the bend portion 12 and the first flange 14.

The bend portion 12 and the first flange 14 are adhered to the second flange 16 at substantially the entire region of the bend portion 12 and the first flange 14 using an adhesive 18. The first flange 14 and the second flange 16 are moreover joined together by spot welding at plural welding portions 20. The plural welding portions 20 extend in a row at intervals to each other along the extension direction of the first flange 14 along the end portion at the second vehicle body panel 34 side of the side wall portion 36, namely along the L direction.

The bend portion 12 described above is formed with a ridge projection portion 24 that projects towards a facing portion 22 side of the second flange 16 that faces the bend portion 12. The ridge projection portion 24 extends along the L direction described above.

Explanation follows regarding operation and advantageous effects of the exemplary embodiment of the present invention.

In order to clarify the operation and advantageous effects of the exemplary embodiment of the present invention, explanation is first given regarding Comparative Examples. Note that for ease of comparison, configuration elements that have the same names in the Comparative Examples as in the exemplary embodiment of the present invention are allocated the same reference numerals.

Figure 6:
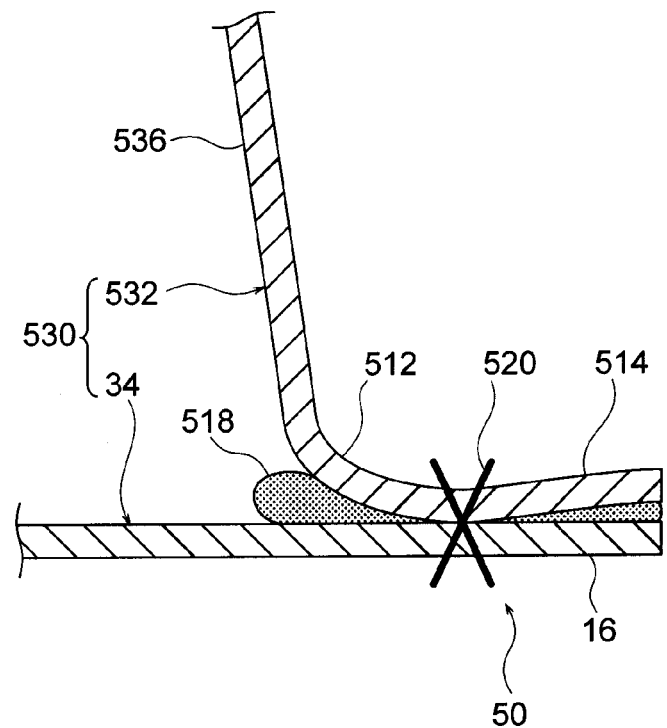
FIG. 6 is a drawing of an adhesion flange structure according to a first Comparative Example.
Figure 7:
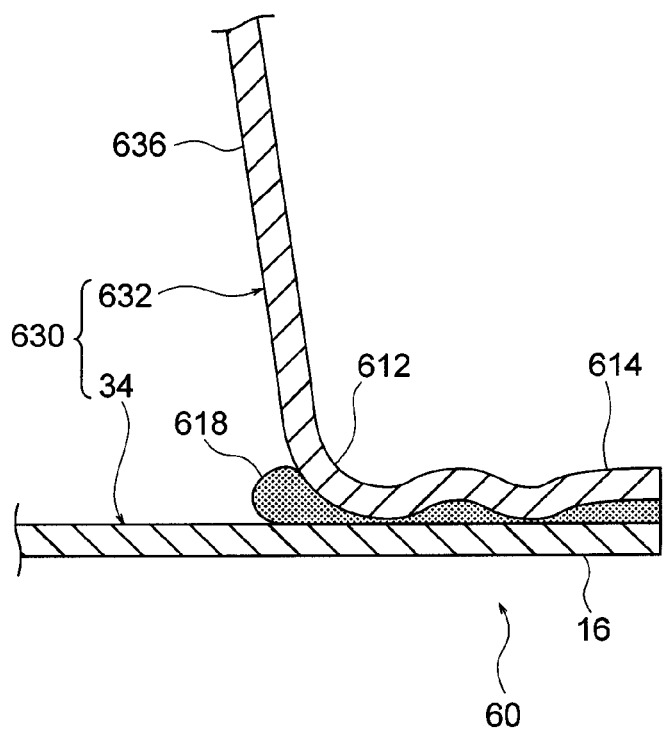
FIG. 7 is a drawing of an adhesion flange structure according to a second Comparative Example.

In adhesion flange structures 50, 60 of the Comparative Examples illustrated in FIG. 6 and FIG. 7, the ridge projection portion 24 of the adhesion flange structure 10 according to the exemplary embodiment described above is omitted.

In the adhesion flange structure 50 of a first Comparative Example illustrated in FIG. 6, the first flange 514 is however bent towards a second flange 16 side due to contact by a spot gun during spot welding.

Moreover, in the adhesion flange structure 60 of a second Comparative Example illustrated in FIG. 7, curves are put into the first flange 614 at plural locations during a manufacturing process.

However, when the first flange 514 is bent towards the second flange 16 side as in the adhesion flange structure 50 of the first Comparative Example illustrated in FIG. 6, the bend portion 512 is adhered to the second flange 16 in a floating state positioned a specific dimension or greater from the second flange 16. The thickness of the adhesive 518 between the bend portion 512 and the facing portion 22 accordingly increases, and the rigidity of the bend portion 512 cannot be secured.

When the first flange 14 is curved at plural locations as in the adhesion flange structure 60 of the second Comparative Example illustrated in FIG. 7, the bend portion 612 is adhered to the second flange 16 in a floating state positioned a specific dimension or greater from the second flange 16, and the rigidity of the bend portion 612 cannot be secured.

Since each of the bend portions 512 and 612 serving as a ridge line portion in the first vehicle body panels 532 and 632 is a location that readily affects the rigidity of the vehicle framework members 530 and 630, there is a concern that the rigidity of the overall vehicle framework member 3 may be decreased if the rigidity of the bend portions 512 and 612 is decreased.

Therefore, as illustrated in FIG. 1, according to the adhesion flange structure 10 of the exemplary embodiment of the present invention, the bend portion 12 is formed with the ridge projection portion 24 that forms a projection towards the facing portion 22 side that is on the opposing side to the bend portion 12. The thickness of the adhesive 18 between the bend portion 12 and the facing portion 22 can accordingly be reduced due to forming the ridge projection portion 24, thereby enabling the rigidity of the bend portion 12 to be secured. The rigidity of the overall vehicle framework member 30 can be increased as a result.

Due to forming the ridge projection portion 24 at the bend portion 12 as described above, the amount by which the bend portion 12 is positioned floating away from the second flange 16 can be kept to within the specific dimension even when the first flange 14 is bent towards the second flange 16 side during spot welding.

Explanation follows regarding modified examples of an exemplary embodiment of the present invention.

Figure 2:
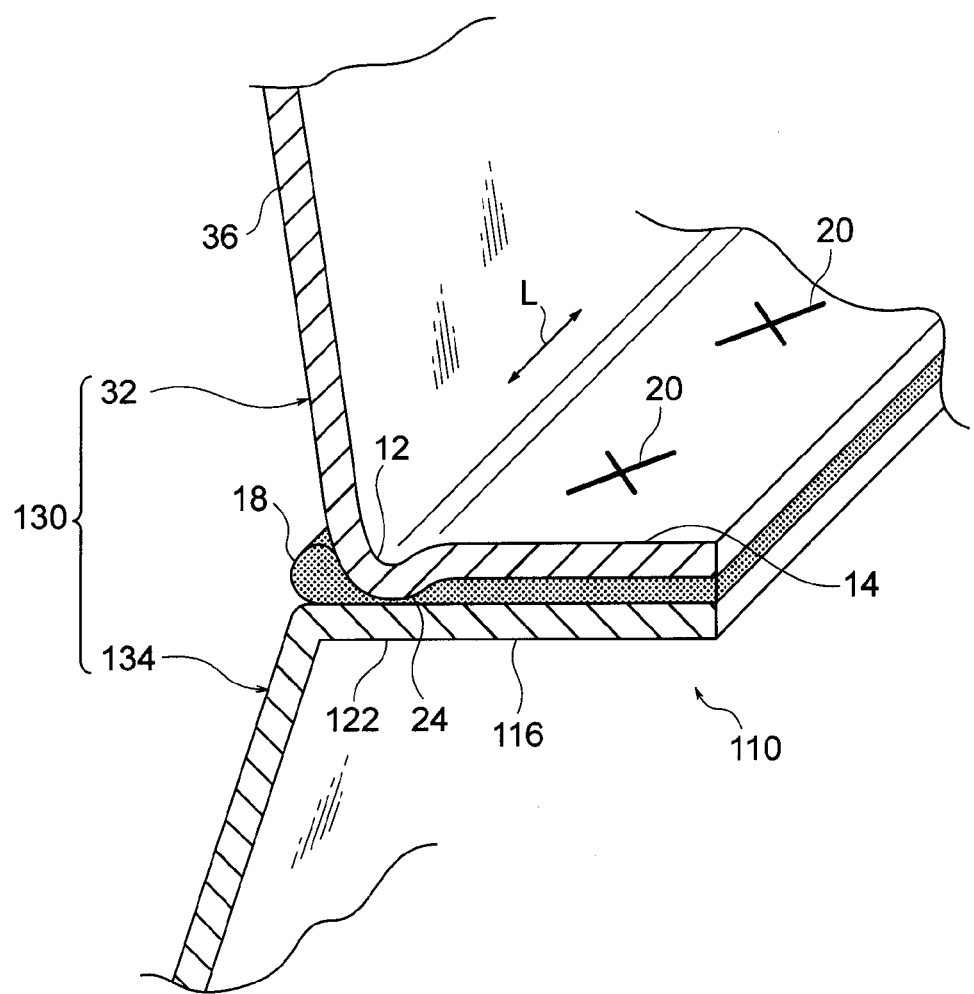
FIG. 2 is a drawing of a first modified example of an adhesion flange structure according to an exemplary embodiment of the present invention.
Figure 3:
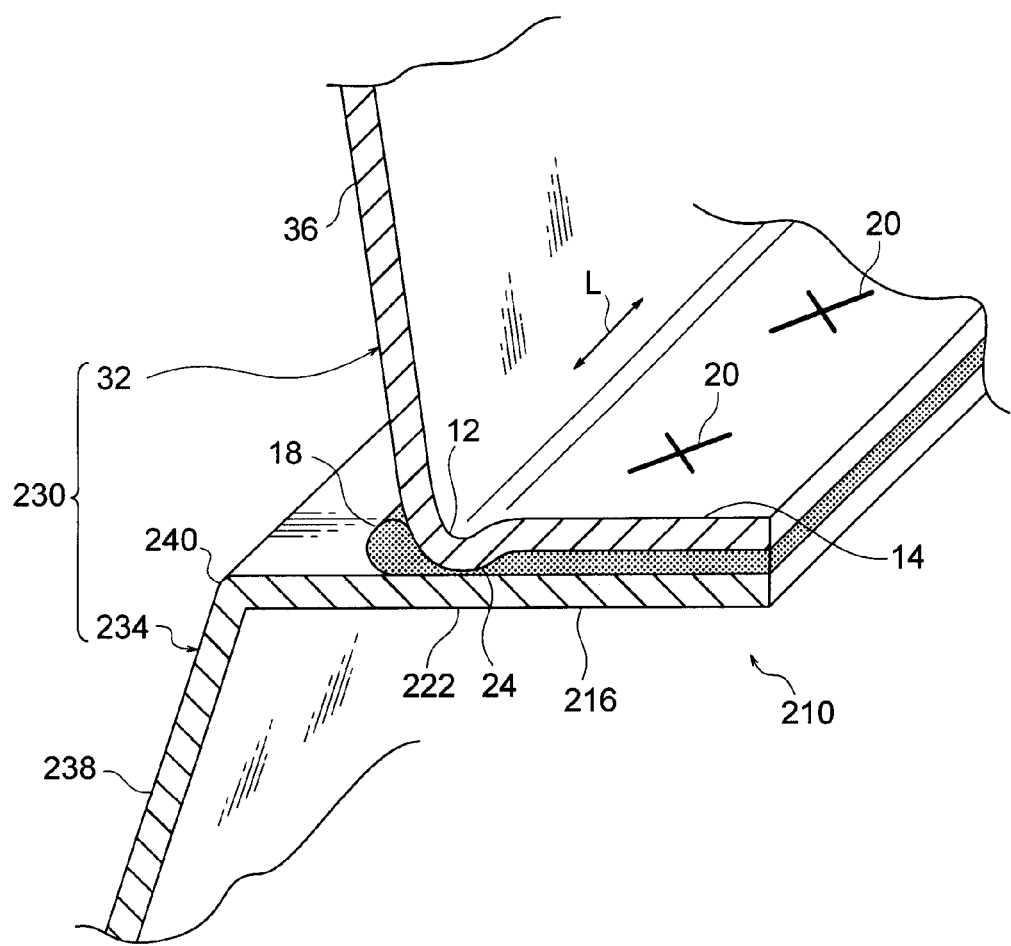
FIG. 3 is a drawing of a second modified example of an adhesion flange structure according to an exemplary embodiment of the present invention.

In the exemplary embodiment of the present invention described above, the second vehicle body panel 34 is formed in a flat plate shape, however as illustrated in FIG. 2, the second vehicle body panel 134 may be formed with a hat shaped cross-section open towards a first vehicle body panel 132 side. In such cases, as illustrated in FIG. 3, a bend portion 240 between the second flange 216 and a side wall portion 238 may be positioned further to an inside of the vehicle framework member 230 than the bend portion 12.

Figure 4:
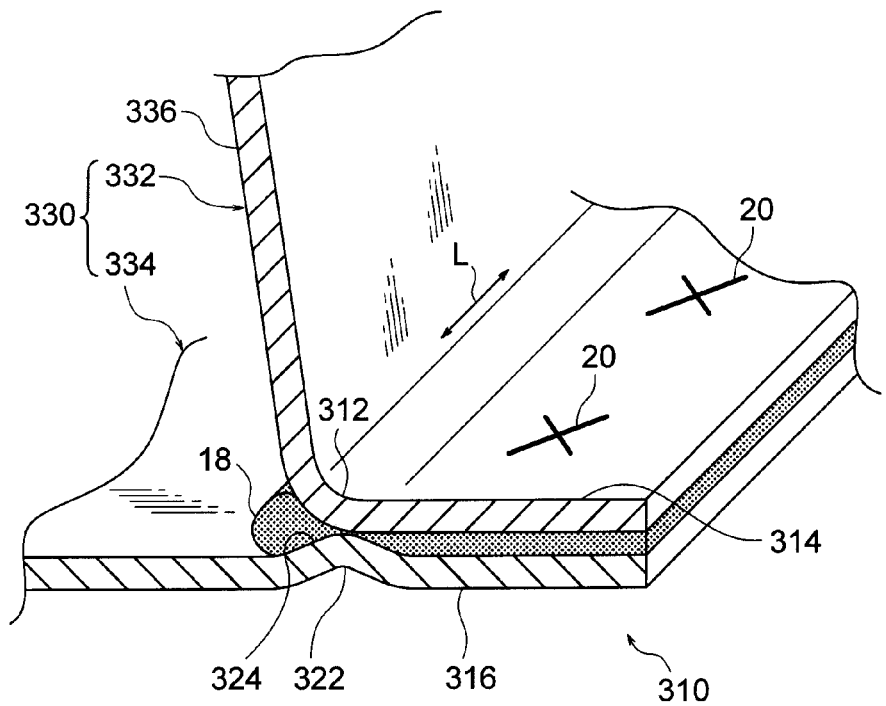
FIG. 4 is a drawing of a third modified example of an adhesion flange structure according to an exemplary embodiment of the present invention.

The ridge projection portion 24 is formed to the bend portion 12 of the first vehicle body panel 32, however as illustrated in FIG. 4, the ridge projection portion 324 may be formed at the facing portion 322 of the second flange 316 that faces the bend portion 312.

Figure 5:
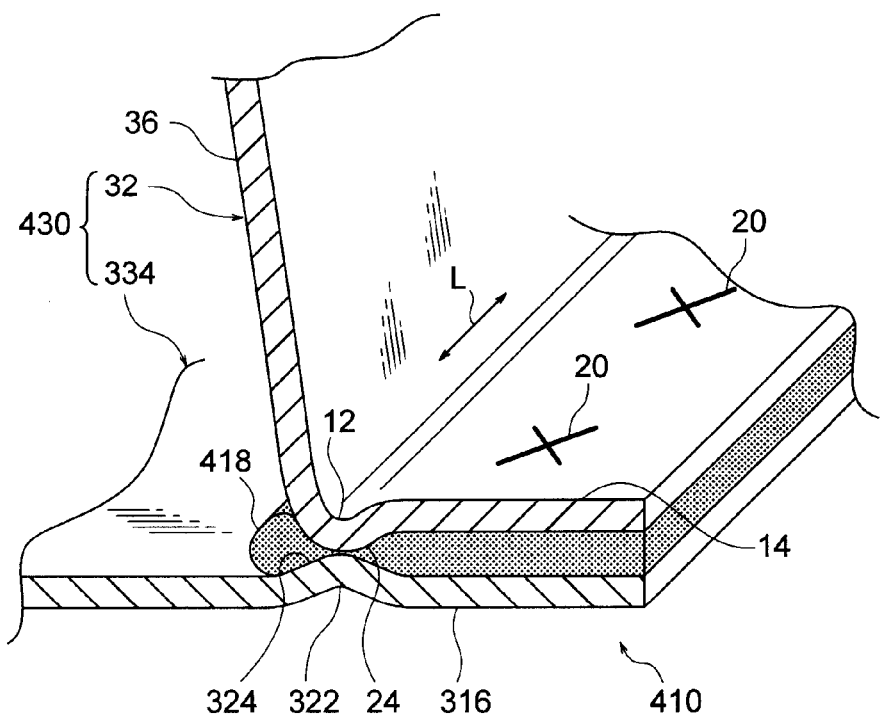
FIG. 5 is a drawing of a fourth modified example of an adhesion flange structure according to an exemplary embodiment of the present invention.

Moreover, as illustrated in FIG. 5, the ridge projection portion 324 may be formed at both the bend portion 12 and the facing portion 322. When such a configuration is employed, the thickness of the adhesive 418 between the bend portion 12 and the facing portion 322 can be reduced even further, thereby enabling the rigidity of the bend portion 12 to be secured even more.

The adhesion flange structures 10, 110, 210, 310 and 410 are applied to the vehicle framework member 30, however the adhesion flange structures 10, 110, 210, 310 and 410 may be applied to a vehicle body section other than the vehicle framework member 30.

In addition to adhering the first flange 14 and the second flange 16 together using the adhesive 18, the first flange 14 and the second flange 16 are also joined together by the plural welding portions 20, however the first flange 14 and the second flange 16 may be joined together using the adhesive 18 alone.

Explanation has been given above of an exemplary embodiment of the present invention, however the present invention is not limited to the above, and obviously various modifications may be implemented within a range not departing from the gist of the present invention.

The invention claimed is:

1. An adhesion flange structure comprising:
 a first flange extending along an end portion of a first vehicle body panel, with a bend portion interposed between the first flange and the end portion;
 a second flange formed at an end portion of a second vehicle body panel, the second vehicle body panel and the first vehicle body panel forming a portion of a vehicle body, and the second flange facing the bend portion and the first flange;
 an adhesive that adheres the bend portion and the first flange to the second flange; and
 a ridge projection portion extending linearly along a longitudinal direction, the ridge projection portion comprising:
  a first ridge projection portion formed at a corner portion of the bend portion of the first flange, and
  a second ridge projection portion formed at a first facing portion of the second flange, wherein the first and second ridge projection portions project from the first and second flanges, respectively, toward each other such that a thickness of the adhesive between the bend portion and the first facing portion is less than a thickness of the adhesive between the first flange and a second facing portion of the second flange that faces a portion of the first flange other than the bend portion.

2. The adhesion flange structure of claim 1, wherein the adhesive directly contacts an entirety of the bend portion.

* * * * *